US008588963B2

(12) United States Patent
Samain

(10) Patent No.: US 8,588,963 B2
(45) Date of Patent: Nov. 19, 2013

(54) COSMETIC OR DERMATOLOGICAL SYSTEM INCLUDING AN INTERNAL CLOCK AND/OR A CLOCK DATA RECEIVER AND AN ADJUSTMENT SYSTEM ENABLING A CHARACTERISTIC OF A PREPARATION TO BE MODIFIED AUTOMATICALLY AS A FUNCTION OF CLOCK DATA

(75) Inventor: Henri Samain, Bievres (FR)

(73) Assignee: L'Oreal, Paris (FR)

( * ) Notice: Subject to any disclaimer, the term of this patent is extended or adjusted under 35 U.S.C. 154(b) by 151 days.

(21) Appl. No.: 13/119,092

(22) PCT Filed: Oct. 23, 2009

(86) PCT No.: PCT/IB2009/054701

§ 371 (c)(1),
(2), (4) Date: May 20, 2011

(87) PCT Pub. No.: WO2010/046885

PCT Pub. Date: Apr. 29, 2010

(65) Prior Publication Data

US 2011/0220139 A1 Sep. 15, 2011

Related U.S. Application Data

(60) Provisional application No. 61/113,009, filed on Nov. 10, 2008.

(30) Foreign Application Priority Data

Oct. 23, 2008 (FR) ..................................... 08 57203

(51) Int. Cl.
*G06F 17/00* (2006.01)

(52) U.S. Cl.
USPC .......................................... 700/233; 700/239

(58) Field of Classification Search
USPC ................................................. 700/233, 239
See application file for complete search history.

(56) References Cited

U.S. PATENT DOCUMENTS

| | | | |
|---|---|---|---|
| 3,934,596 | A | 1/1976 | Suntheimer et al. |
| 4,962,910 | A | 10/1990 | Shimizu |

(Continued)

FOREIGN PATENT DOCUMENTS

| | | | |
|---|---|---|---|
| DE | 100 16 078 | A1 | 5/2001 |
| DE | 20 200 40 11 856 | U1 | 12/2004 |

(Continued)

OTHER PUBLICATIONS

French Republic Preliminary Report for National Register No. FA 715504 FR 0857203 mailed Aug. 6, 2009.

(Continued)

*Primary Examiner* — Timothy Waggoner
(74) *Attorney, Agent, or Firm* — Oliff & Berridge, PLC

(57) ABSTRACT

A cosmetic or dermatological system including a handheld packaging and dispenser device including one or more compositions from which a preparation to be delivered in a fluid form suitable for an application onto skin, mucous membranes or keratinous fibers, an internal clock and/or a clock data receiver, an adjustment system coupled to or suitable for being coupled to the packaging and dispenser device, enabling at least one property of the preparation dispensed by the packaging and dispenser device to be modified, and a processor for controlling the adjustment system, the controlling based on at least of clock data delivered by the internal clock and/or the clock data receiver, or for informing the user, at least as a function of the clock data, of an action to be taken on the adjustment system.

17 Claims, 6 Drawing Sheets

(56) References Cited

U.S. PATENT DOCUMENTS

| | | | | |
|---|---|---|---|---|
| 5,746,348 | A | 5/1998 | Bloom | |
| 5,752,621 | A * | 5/1998 | Passamante | 221/131 |
| 5,785,960 | A | 7/1998 | Rigg et al. | |
| 5,812,064 | A * | 9/1998 | Barbour | 340/5.91 |
| 5,848,732 | A | 12/1998 | Brugger | |
| 6,294,999 | B1 * | 9/2001 | Yarin et al. | 705/2 |
| 6,371,451 | B1 | 4/2002 | Choi | |
| 6,595,389 | B2 | 7/2003 | Fuchs | |
| 6,715,642 | B2 * | 4/2004 | Engel et al. | 222/63 |
| 6,769,580 | B2 * | 8/2004 | Muderlak et al. | 222/646 |
| 6,986,442 | B2 | 1/2006 | Engel et al. | |
| 7,247,140 | B2 | 7/2007 | Ophardt | |
| 7,837,063 | B2 * | 11/2010 | Stoddard | 222/14 |
| 7,850,051 | B2 | 12/2010 | Py et al. | |
| 8,102,735 | B2 * | 1/2012 | Morse | 705/2 |
| 8,224,481 | B2 * | 7/2012 | Bylsma et al. | 700/239 |
| 2003/0064350 | A1 | 4/2003 | Rubinstenn et al. | |
| 2003/0069667 | A1 | 4/2003 | Dirksing et al. | |
| 2004/0133306 | A1 | 7/2004 | Schmid | |
| 2004/0188469 | A1 | 9/2004 | Lambrakis et al. | |
| 2005/0005678 | A1 | 1/2005 | Duranton | |
| 2006/0108247 | A1 | 5/2006 | Liechty et al. | |
| 2006/0258946 | A1 | 11/2006 | Hayano et al. | |
| 2008/0047972 | A1 | 2/2008 | Bartholomew et al. | |

FOREIGN PATENT DOCUMENTS

| | | | |
|---|---|---|---|
| EP | 2 081 668 | A | 7/2009 |
| FR | 2 807 346 | | 10/2001 |
| WO | WO 98/30189 | A | 7/1998 |
| WO | WO 02/094423 | A1 | 11/2002 |
| WO | WO 2006/044585 | A2 | 4/2006 |
| WO | WO 2008/046518 | A1 | 4/2008 |

OTHER PUBLICATIONS

French Republic Written Opinion for National Register No. FR 0857203 mailed Aug. 6, 2009.
International Search Report for International Application No. PCT/IB2009/054701 mailed Feb. 4, 2010.
Written Opinion for International Application No. PCT/IB2009/054701 mailed Feb. 4, 2010.
International Search Report for International Application No. PCT/IB2009/054700 mailed Feb. 4, 2010.
Written Opinion for International Application No. PCT/IB2009/054700 mailed Feb. 4, 2010.
Republic of France Search Report for National Registration No. FA 715505 FR 0857204 mailed Jul. 20, 2009.
French Republic Written Opinion for National Register No. FR 0857204 mailed Jul. 20, 2009.
International Search Report for International Application No. PCT/IB2009/054699 mailed Feb. 12, 2010.
Written Opinion for International Application No. PCT/IB2009/054699 mailed Feb. 12, 2010.
Republic of France Search Report for National Registration No. FA 715207 FR 0857200 mailed Jul. 20, 2009.
French Republic Written Opinion for National Register No. FR 0857200 mailed Jul. 20, 2009.
U.S. Appl. No. 13/119,065, filed Mar. 15, 2011.
U.S. Appl. No. 13/119,073, filed Mar. 15, 2011.
Mar. 28, 2013 Office Action issued in U.S. Appl. No. 13/119,065.
Jul. 29, 2013 Office Action issued in U.S. Appl. No. 13/119,073.

* cited by examiner

COSMETIC OR DERMATOLOGICAL SYSTEM INCLUDING AN INTERNAL CLOCK AND/OR A CLOCK DATA RECEIVER AND AN ADJUSTMENT SYSTEM ENABLING A CHARACTERISTIC OF A PREPARATION TO BE MODIFIED AUTOMATICALLY AS A FUNCTION OF CLOCK DATA

TECHNICAL FIELD

The present disclosure relates to packaging and dispensing cosmetics or dermatological preparations. More particularly, the present disclosure relates to packaging and dispensing of compositions suitable for application to the skin, the mucous membranes, and/or keratinous fibers.

BACKGROUND

There exists a desire for cosmetic preparations available in numerous variants in order to adapt to different situations and different user characteristics (e.g., skin type). Thus, users may like to have lipsticks with various retention powers. In general, a person uses the same lipstick all day. However, present lipsticks are not adapted to the time of day, which may be desirable because if the lipstick is applied early in the morning it is desirable to have maximum retention power, whereas limited retention power for lipstick applied late in the evening may be desirable.

Lipsticks exist having different retention powers, because they contain varying quantities of a retention active agent. However, a user may not always think to adapt the lipstick to circumstances and does not find it practical to maintain several different lipsticks during the day.

The problems are of interest because the required retention power is not merely inversely proportional to time of day. With lipstick, the user may expect lipstick applied immediately before a meal to present good retention power so as to avoid leaving marks on glasses, for example.

With a hair spray, the user may desire its retention power to be at its greatest if the preparation is applied in the morning, and for its retention power to be limited if it is applied in the evening. In general, a person may comb out the hair in the evening. Thus, it is desirable for retention power to be limited in the evening to avoid inconvenience. The user may prefer preparations with greater wetting power to achieve good retention power in the morning, and preparations that are drier in the evening because they present lower retention powers.

Situations may be complicated because a person may use a hair spray in the morning, but requires a formula with little wetting power because wetter formulas take longer to dry, sometimes as much as 15 minutes, before it is possible to be active.

The user may be faced with a problem of choice when deciding what product to acquire. This can lead to hesitation in selecting one strength rather than another, because the user knows in advance that the choice is not easy. A user may acquire several strengths, but that solution may not be practical, for at least the reasons of storage space and expense.

Furthermore, even though manufacturers may attempt to clearly identify the strengths of their products and to display the corresponding information on the packaging, a user can make a mistake at the time of application. If manufacturers add other signs so that users can recognize strengths, those additional signs run the risk of being difficult to recognize or remember for some users.

The desire to have different strengths is not limited to those described above, but may also apply to preparations for providing protection against the sun, drying, high or low temperatures, antiperspirants and deodorants, fragrances, and hair gels.

It is possible to make products in a variety of strengths or to make a product in a single strength and rely on the user for managing application thereof so as to adjust its strength.

For example, it is possible to make antiperspirants in a variety of strengths. However, manufacturers have not typically opted for this approach for at least the reason that surveys have shown that users may not like the clutter of several products. The user may adjust the strength of a product by varying the quantity applied. However that can lead to problems, because it may be difficult to apply small quantities. It may be quite easy to apply large quantities, but the user can then be troubled by the problems of discomfort that can lead to, for example concerning the sensation and appearance of wetness that remain for many minutes after application.

Furthermore, certain products cannot be made available in a variety of strengths. This may apply typically to products that are already made available in multiple colors, such as hair coloring products, for example.

Making such hair coloring products available in a variety of strengths may lead to a substantial increase the number of products available. However, under such circumstances, the user may not have an option other than to adapt a product as a function of the moment it is used, and this often leads to a result that may not be desirable.

Application FR 2 807 346 describes a flask including an electronic circuit enabling a message to be delivered when the user presses on a dispenser button. The flask may include at least one sensor of an external physical parameter, in particular a sensor of ambient lighting and/or ambient temperature.

The electronic circuit may include a microcontroller that receives data from a clock. The message that is delivered may take account of the time of day or of the time that has elapsed since the previous use.

SUMMARY

Exemplary embodiments of the disclosure provide, a cosmetic or dermatological system comprising:

- a packaging and dispenser device including one or more compositions from which a preparation is delivered;
- an internal clock and/or a clock data receiver;
- an adjustment system coupled to or suitable for being coupled to the packaging and dispenser device, enabling at least one property of the preparation dispensed by the packaging and dispenser device to be modified; and
- means for acting automatically on the adjustment system as a function at least of clock data delivered by the internal clock and/or the clock data receiver, or for informing the user, at least as a function of the clock data, of an action to be taken on the adjustment system.

According to various embodiments, the preparation is delivered in non-gaseous form, for example, in fluid form such as a liquid, cream, gel, suspension, emulsion, or flowable powder.

According to systems and methods of the present disclosure, the system is capable of optimizing the formulation of the preparation that is dispensed in automatic or semi-automatic manner. The term “automatic” should be understood as meaning that the adjustment of the formulation of the preparation does not involve user interaction with an adjustment member. The term “semi-automatic” should be understood as meaning that the adjustment may involve an action on the part of the user, i.e. the user must act manually on an adjustment member such as for example: an adjustment button, a slider, an adjustment knob; and as a function of information provided by the system, e.g. in audible manner, or in visual manner, e.g. by an indicator light, a display, or a screen that may be incorporated in the system, e.g. incorporated in the packaging and dispenser device.

By means of the disclosure, when the user makes use of the system, the preparation that is made and readied for dispensing presents a concentration of a primary or a secondary active agent that is desirable (e.g., optimized) for the moment of use. Such optimization is performed on the basis at least of the clock data.

The term “primary active agent(s)” is used to designate the active agent(s) imparting the main effectiveness to a preparation, e.g. wetting agents for a shampoo. The term “secondary active agent(s)” is used to designate the active agent(s) playing a role in making the preparation attractive; for example, with a shampoo, agents providing fragrance and/or controlling rheology.

According to some embodiments of the present disclosure, it may be possible to obtain a delivered preparation that is desirable (e.g., optimized), i.e., that contains the primary and/or secondary active agent in concentrations that are desirable for the moment of use. If the system according to exemplary embodiments of the disclosure were to be used at some other moment, then it could provide a different adjustment for the concentration of the active agent.

The disclosure may be used to adjust the concentration of the active agent and/or to vary the nature of the active agent(s) present in the preparation as dispensed, e.g. depending on the number of reservoirs of the packaging and dispenser device and on the way in which the adjustment is performed.

Optionally, the system may be arranged to communicate with an expert system suitable for processing the clock data in more complex manner. This makes it possible to simplify the system itself, which then may not include more powerful computation means.

Energy for powering the clock and/or the clock data receiver, and/or the adjustment system may be provided by an internal source of electricity (e.g., a battery), an external source of electricity, ambient light, or by the user acting on an energy converter system, e.g. an electromechanical mechanism actuated by the user.

Energy for dispensing the preparation and for making it uniform, where desired, may be provided by the user acting on an energy converter or acting directly, e.g. by pressing on one or more walls of the packaging and dispenser device. The energy may also be provided by an internal or external electricity source, e.g. by transforming ambient light into electricity via photovoltaic cells.

The adjustment system may be configured to be activated automatically when the user acts on the packaging and dispenser device in such a manner as to cause the preparation to be delivered. For example, the packaging and dispenser device may include a switch that is operated when the user presses on a wall of the device to expel the content from one or more of its reservoirs towards the outlet.

The cosmetic or dermatological system according to exemplary embodiments of the disclosure may be configured to modify the concentration of at least one active agent in the preparation that is dispensed as a function at least of said clock data.

For this purpose, the packaging and dispenser device may have two reservoirs containing two starting compositions, also referred to as starting products, for mixing together to form the delivered preparation, the adjustment system acting as a function at least of said clock data to modify the ratio of one starting composition relative to the other in the dispensed preparation. The term “starting composition” shall be understood to mean a composition as originally supplied to a reservoir and configured for inclusion and/or processing into a preparation. Such starting compositions may comprise active agents, neutral agents, and/or any combination thereof as desired. A composition may include a fluid, e.g. liquids, creams, gels, suspensions, emulsions, flowable powder etc., and/or a solid, e.g., a stick, etc.

Adjustment may be performed automatically as a function of, for example, a duration that has elapsed since a reference instant, e.g. corresponding to the most recent use in time. In some embodiments, the system may include an elapsed time meter that is reinitialized each time the system is used, in particular each time the preparation is dispensed. Depending on the application, a longer relative time may lead to providing greater or smaller enrichment with the active agent.

The adjustment may also take account of at least absolute time, i.e., time as measured independently of any events and/or of relative time, i.e., time as measured relative to other events (e.g., a previous application of a preparation).

This may be helpful, for example for shampoo, where provision may be made not only for the wetting agent content to be small if the application is performed late in the day (in the evening), its content may be even smaller if the previous application was recent.

As examples of preparations that may be adjusted solely on the basis of relative time, within a system according to exemplary embodiments of the disclosure, mention may be made for example of the following:

- cleaning products (shampoo, conditioner, toothpaste, etc.);
- products that have effects that are durable (permanent wave, hair colorant, bleach, skin colorant); the active agent content in the preparation may be reduced if the previous application was recent.

Relative time may be measured in hours, days, months, or other suitable time period (e.g., seconds, milliseconds, minutes, etc.)

Adjustment may also be performed automatically as a function of a physiological cycle, e.g. the menstrual cycle, and as a function of correspondence between the cycle and said clock data. The system may be arranged to enable the user to inform the system about position within the cycle.

The system may be arranged to access an electronic diary of the user and to adjust the property of the preparation as a function at least of data coming from said diary, and of said clock data. For example, the system may be arranged to connect to a computer address containing the diary data or to receive diary data via a personal digital assistant (PDA), a mobile telephone, and/or a computer, among others. Clock data is different from the outlet signal of an oscillator taking alternatively 0 and 1 binary states, as in a computer. One of ordinary skill in the art will understand that the internal clock referred to here can differ from a binary clock (i.e., a clock pulse generator) associated with a digital processor. For example, the described internal clock may be provided as hardware and/or software, and be configured to track year, month, day, hour, minute, seconds, and/or season (i.e., winter, spring, summer, and fall), and may be based on, for example, Greenwich Mean Time (GMT) or any other suitable time base.

The system according to exemplary embodiments of the disclosure may include signaling means enabling a message to be broadcast as a function at least of said clock data, e.g. to remind the user that a new application of the preparation is desirable, given the duration that has elapsed since the previous application.

The adjustment system, the internal clock and/or the clock data receiver, and the means for acting on the adjustment system as a function of the clock data may be incorporated in the packaging and dispenser device, e.g. being contained in the same housing as the reservoir(s), e.g. in a manner that is not separable by the user.

The system according to exemplary embodiments of the disclosure may include a base station associated with the packaging and dispenser device, e.g. including the internal clock and/or clock data receiver. The base station may include means for acting on the adjustment system as a function of the clock data coming from the internal clock and/or said receiver.

The base station may optionally be secured to the packaging and dispenser device while the device is in use for dispensing the preparation.

The base station may be separably mounted on the packaging and dispenser device.

The system may include a plurality of packaging and dispenser devices associated with the same base station. By way of example, the user may couple the base station to the packaging and dispenser device containing the starting composition(s) from which the preparation is to be dispensed. In a variant, the base station controls the packaging and dispenser device remotely while it is in use. In another variant, the packaging and dispenser device that is to be used is coupled temporarily to the base station for adjustment purposes and is then separated therefrom while the preparation is being dispensed.

With an external clock, the system according to exemplary embodiments of the disclosure may be configured to warn the user if the clock signals it receives are too weak or degraded.

For adjustment purposes, the system may also be arranged to take account of data relating to use of the packaging and dispenser device, e.g. the duration of use, the number of uses, or the frequency of use. For example, the system may take account of a duration of exposure to the sun between two uses in order to modify the content of the active agent, e.g. to take into consideration tanning and the protection it provides.

The system may also take account of internal information, e.g. relating to the levels in the reservoirs or a flow rate measurement.

The system may constitute a unit suitable for being held in the hand. Where desired, the system may comprise a base station and the packaging and dispenser device in the form of a handpiece. By way of example, this packaging and dispenser device may be arranged to be positioned on the base station when not dispensing the preparation.

The base station may include the clock data receiver and/or the internal clock together with at least a portion of the adjustment system. For example, the base station may include an actuator suitable for acting on an adjustment member of the device when the device is placed on the base station or when it is coupled to the base station in some other way. The packaging and dispenser device may include the reservoirs containing the starting compositions and means for dispensing the preparation. When the user separates the packaging and dispenser device from the base station, the adjustment is as defined by the base station. Where desired, the base station may act as a docking station for a mobile telephone, which telephone may be used to control the adjustment system.

The system according to exemplary embodiments of the disclosure may receive information from an individual terminal or from another system according to exemplary embodiments of the disclosure. The individual terminal may be of any type, e.g. a relay, a mobile telephone, a PDA, a personal computer, a local server, etc.

According to embodiments of the present disclosure, the preparations dispensed by a system according to exemplary embodiments of the disclosure may be cosmetics or preparations presenting physiological activity. The preparations may be different from perfumes.

According to some embodiments of the present disclosure, the adjustment system may act on the vitamin D content in the dispensed preparation, e.g. in order to increase that content during winter months.

According to some embodiments of the present disclosure, the adjustment system acts on the contents, in the dispensed preparation, of compounds that are not very compatible with sunshine, e.g. vitamin C, with such content being increased in the evening, for example.

As examples of preparations in which the content of active agent may depend on absolute time, in particular on time of day, and/or day of the week, and/or month, mention may be made of sunscreens. Under such circumstances, the dispensed preparation may for example be richer in sun filter(s) earlier in the day. Furthermore, the dispensed preparation may be richer in sun filter(s) in sunnier seasons. The dispensed preparation may also be richer in sun filter(s) when the day of the week is likely to involve time spent outside, e.g. holidays or weekends.

The disclosure also applies to making preparations for providing protection against drying of the skin or against greasy skin or acne.

Typically, for certain women, the skin may have increased oil production, for example, leading to a "greasy" look during menstruation. Furthermore, at the weekend, some people may wash less often and apply fewer treatments to the skin. It may thus be desired for the preparation to carry a greater concentration of active agent on Fridays and Mondays. Moreover, it may be preferable for a preparation against greasy skin to be strong in the evening and weaker in the morning. This is because at night, the skin is not subjected to cold or to wind so there may be less harm in abrading the skin.

Embodiments of the present disclosure may apply to making antiperspirants, deodorants, foot care products, perfumes, and products for providing protection against wintry weather. The concentration of the active agent, e.g. an aluminum salt, an antibacterial agent, or a fragrance may be adjusted depending on the time of day, the day of the week, or the season.

Embodiments of the present disclosure may apply to preparations for providing protection against mosquitoes or other insects and parasites. The content of the active agent, typically N,N-diethyl-meta-toluamide (DEET), may be adjusted as a function of the time of use and/or of the season.

Embodiments of the present disclosure may apply to preparations for washing the body and the hair. The content of active agent, e.g. wetting agent, anti-dandruff agent, etc., may be adjusted as a function of the time of day, because washing may be stronger in the morning than in the evening. Content may be adjusted as a function of the season, given that there is often a greater desire for wetting agent in the winter than in summer.

Embodiments of the present disclosure may apply to mouth care products, in particular toothpaste. The content of active agent, e.g. wetting agent, fluoride, powders, freshening agents, may be adjusted as a function of the time of day.

Embodiments of the present disclosure may apply to colored preparations such as makeup, e.g. foundation, powder, eyeliners, mascaras, lipsticks, gloss, nail varnish, blush, etc., and to compositions for the hair, e.g. oxidation tints, direct tints, etc. The content of active agent, e.g. tint agents, in particular pigments, waxes, powders, sheen agents, retention agents, may be adjusted as a function of the time of day, or of the day or the month. For example, the contents of colorants, e.g. bases and couplers, direct colorants, docosahexaenoic acid (DHA), . . . , and of pigments may be adjusted in time, in quantity, and in ratio in order to match the season.

The contents of retention agents may be adjusted as a function of the season, it being understood that in winter it is desirable to enhance the ability to withstand water, while in summer it is desirable to enhance the ability to withstand light for persistent coloring, and to withstand sweat and heat for temporary coloring, e.g. makeup.

Embodiments of the present disclosure may apply to hair products such as hair sprays, gels, setting lotions, foams, weighting products. The content of active agent, e.g. polymer or adhesives or waxes in general, may be adjusted as a function of the time of day and the month.

Embodiments of the present disclosure may apply to products for durably shaping hair, such as permanent waves or products for uncurling or smoothing. The content of active agent, e.g. thiol, alkali, may be adjusted as a function of the season.

The packaging and dispersing device of the system may be handheld and portable. In other words, the system and/or the packaging and dispenser device may be handled, i.e. may be held in one hand and actuated by one hand.

According to further embodiments of the present disclosure, a cosmetic or dermatological system is provided. The system may include a packaging and dispenser device including one or more compositions from which a preparation to be delivered in a fluid form suitable for an application onto skin, mucous membranes or keratinous fibers, an internal clock and/or a clock data receiver, and an adjustment system coupled to or suitable for being coupled to the packaging and dispenser device, enabling at least one property of the preparation dispensed by the packaging and dispenser device to be modified, the adjustment system configured to modify a concentration of at least one active agent in the preparation. The system may further include a processor for controlling the adjustment system, the controlling based on at least of clock data delivered by the internal clock and/or the clock data receiver, or for informing the user, at least as a function of the clock data, of an action to be taken on the adjustment system.

According to further embodiments of the present disclosure, a cosmetic or dermatological system is provided. The system includes a packaging and dispenser device including one or more compositions from which a preparation to be delivered in a fluid form suitable for an application onto skin, mucous membranes or keratinous fibers, an internal clock and/or a clock data receiver, and an adjustment system coupled to or suitable for being coupled to the packaging and dispenser device, enabling at least one property of the preparation dispensed by the packaging and dispenser device to be modified. The system further includes a processor for controlling the adjustment system as a function at least of clock data delivered by the internal clock and/or the clock data receiver, wherein the controlling is based on an absolute time.

Aside from the structural arrangements set forth above, the invention could include a number of other arrangements, such as those explained hereinafter. It is to be understood that both the foregoing description and the following description are exemplary.

BRIEF DESCRIPTION OF THE DRAWINGS

The accompanying drawings, which are incorporated in and constitute a part of this specification, illustrate a number of exemplary features of a non-limiting embodiment of the invention and together with the description, serve to explain the principles of the invention. In the drawings.

MORE DETAILED DESCRIPTION

Figure 1:
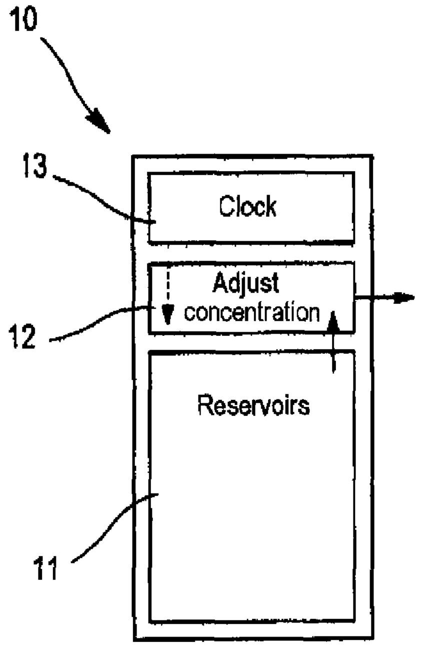
FIGS. 1 to 6 and 16 to 24 are diagrams showing systems according to exemplary embodiments of the invention.

Reference will now be made in detail to exemplary embodiments of the invention, examples of which are illustrated in the accompanying drawings. Wherever possible, the same reference numbers will be used throughout the drawings to refer to the same or like parts. It is to be understood that both the foregoing general description and the following detailed description are exemplary and explanatory only and are not restrictive of the invention, as claimed. FIG. 1 shows an exemplary cosmetic or dermatological system 10 according to exemplary embodiments of the disclosure. System 10 may comprise one or more reservoirs 11 containing one or more compositions (e.g., containing active and/or neutral agents) from which a preparation is dispensed. These compositions may also be referred to throughout the disclosure as starting compositions and/or products. System 10 may further include an adjustment system 12, and a clock 13, which may be interchanged with a clock data receiver.

Adjustment system 12 is controlled at least by clock data to adjust the concentration of active agent(s) in the dispensed preparation. System 10 includes components for this purpose, as described in greater detail below.

System 10 includes a packaging and dispenser device, e.g. comprising a housing containing the starting composition(s), adjustment system 12, clock 13, and means enabling action to be taken on the adjustment system by clock data. The means for acting and/or processing means may comprise a processor, a microprocessor, and/or microcontroller, a specialized integrated circuit, electronic comparators, transistors, diodes, amplifiers, and/or any other suitable digital or analog electronic components configured for processing. For example, the means for acting and/or processing means may comprise a circuit including an i386 architecture processor, a RISC processor, and/or other components configured to cause execution of instructions.

In a variant, system 10 comprises a base station and a packaging and dispenser device that is capable of being separated from the base station, which base station may for example include all or part of adjustment system 12, the clock 13, and the processor for acting on adjustment system 12 on the basis of clock data.

Under such circumstances, the packaging and dispenser device includes, for example, the starting compositions and means for dispensing a mixture made from the starting compositions. An adjustment member of the device may be actuated by the base station as a function of the active agent content in the preparation to be dispensed.

The reservoir(s) 11 of system 10 according to exemplary embodiments of the present disclosure may optionally be refillable, being optionally separable from the packaging and dispenser device. The packaging and dispenser device may enable one or more reservoirs 11 to be exchanged by the user, where desired.

In a variant, system 10 enables the clock and/or adjustment system 12 to be exchanged.

Figure 2:
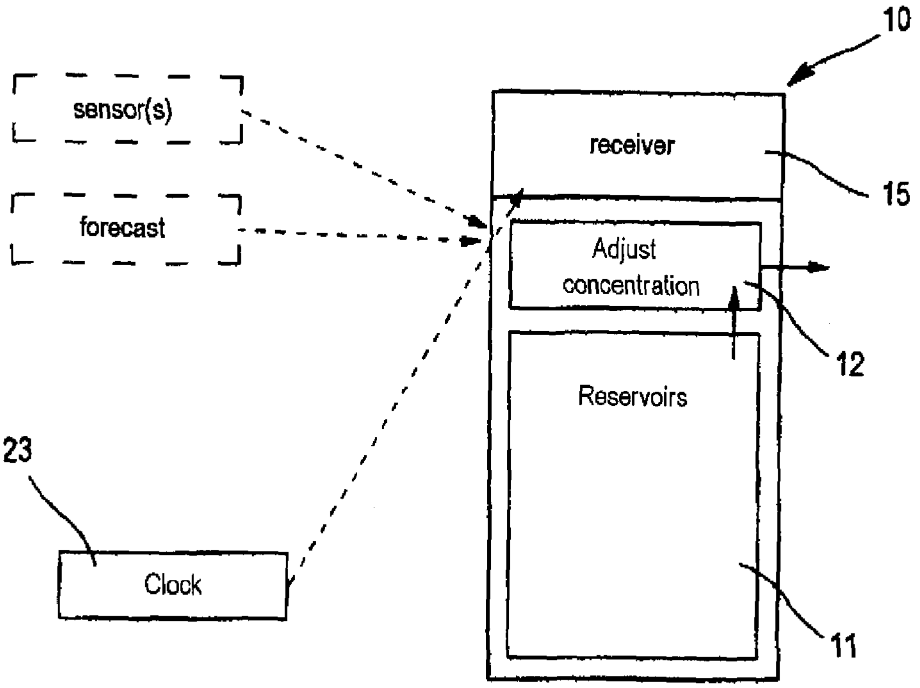

The clock may be an internal clock incorporated in the packaging and dispenser device, as shown in FIG. 1, or in a variant, a remote external clock 23, as shown in FIG. 2, e.g. located in a base station in the form of a console, a base, packaging, or a bathroom mirror.

The packaging and dispenser device may itself be provided with a receiver for receiving clock data, wirelessly or by wire.

Figure 3:
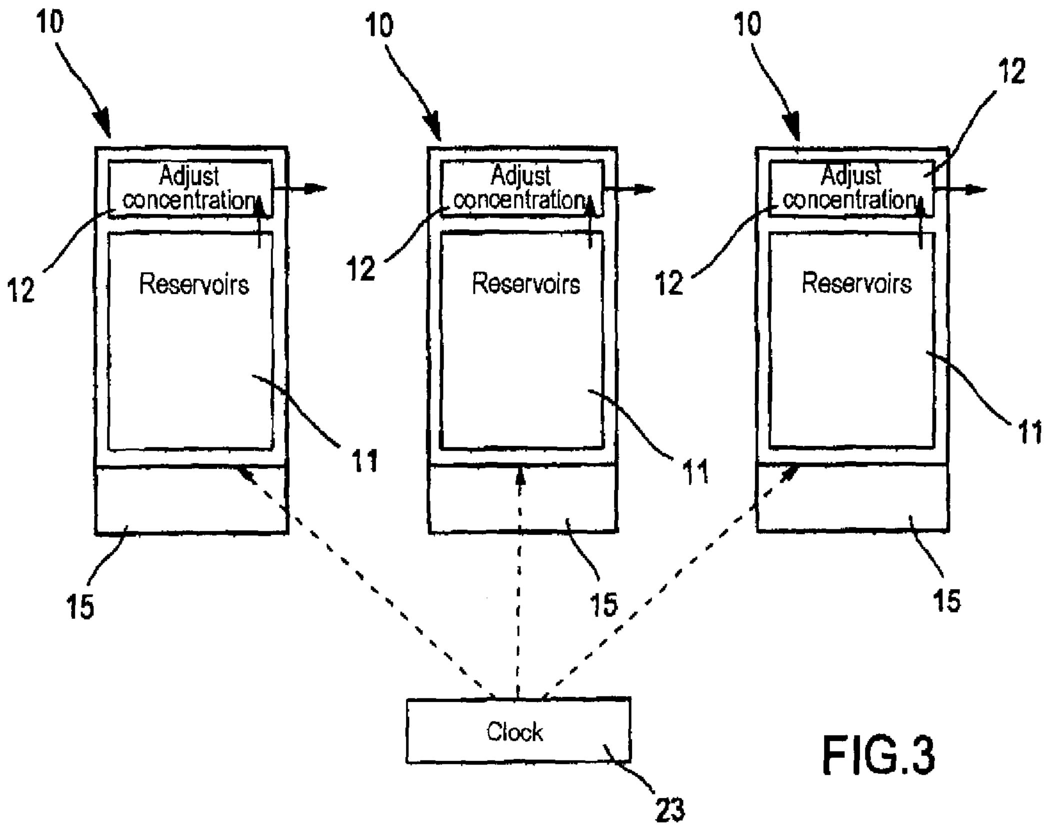

In the particular example shown in FIG. 3, the clock is common to a plurality of packaging and dispenser devices.

For example, a location (e.g., a bathroom) may be provided with a base station including the remote external clock 23 or a clock data receiver, and interacting with a plurality of packaging and dispenser devices. In such embodiments, each packaging and dispenser device may include a local receiver 15 for receiving data transmitted by the base station.

It is possible to do without a dedicated clock whether or not it is incorporated in system 10 according to exemplary embodiments of the disclosure, providing system 10 is arranged to pick up time data coming from pre-existing clocks. For example, system 10 may be arranged to receive time data transmitted by WiFi, Bluetooth, and/or satellite transmissions, and/or by Microsoft solutions framework (MSF), Data communication function (DCF), Global positioning system (GPS), and/or Network time protocol (NTP) signals, or other suitable transmission methods.

Figure 4:
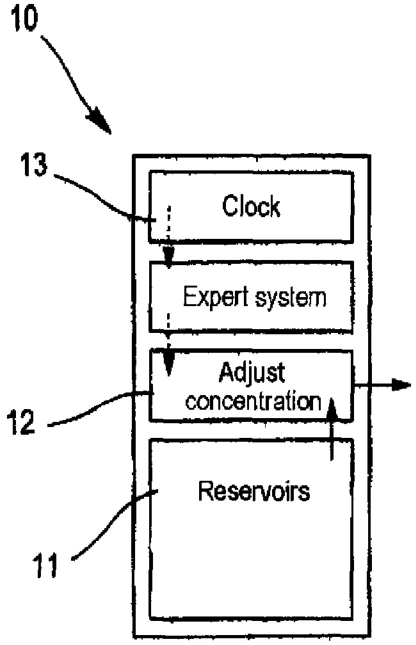

According to exemplary embodiments of the disclosure, system 10 may include one or more expert systems providing assistance in the directions to be taken by adjustment system 12 on the basis of the clock data. Such expert system(s) may optionally be incorporated in the packaging and dispenser device, as shown in FIG. 4.

Figure 5:
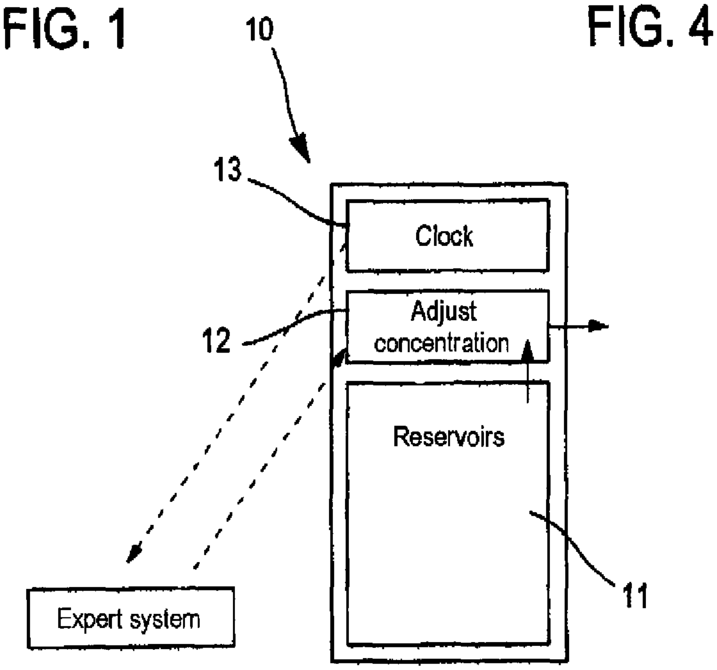
Figure 6:
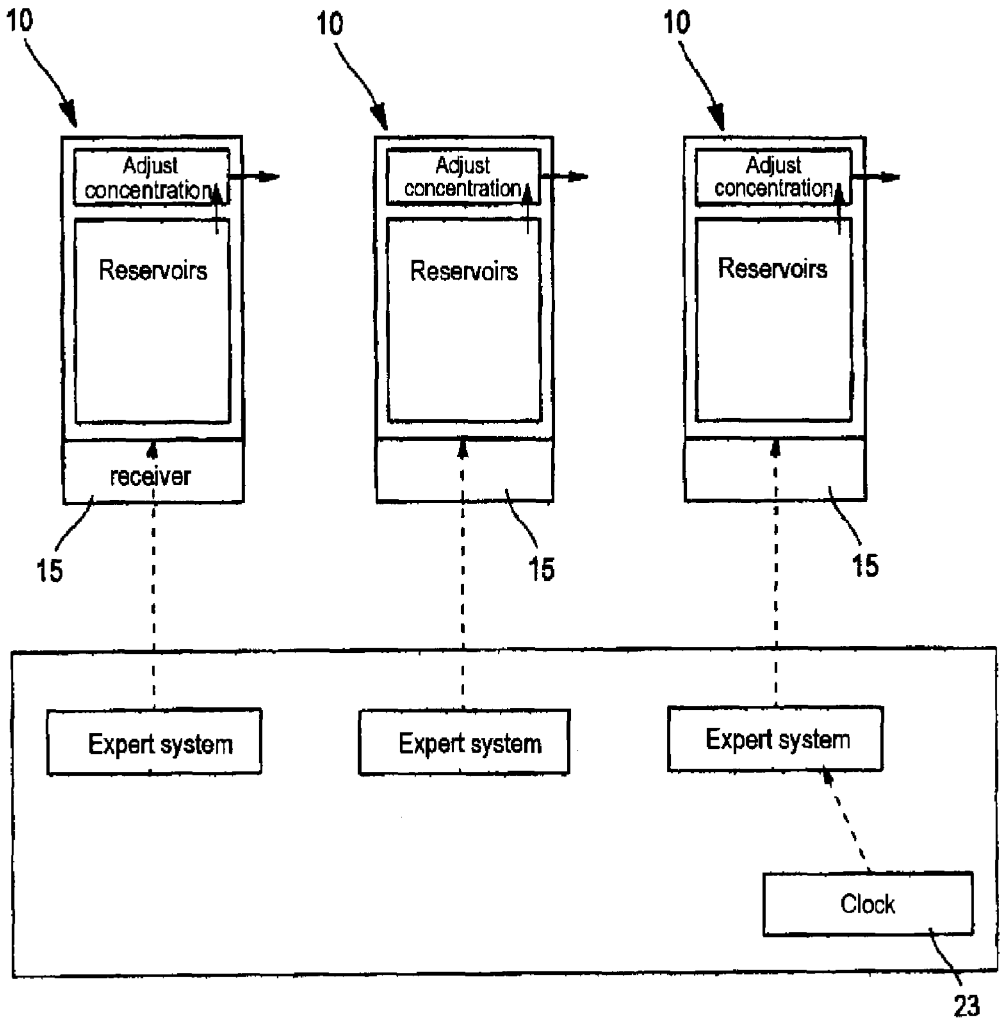

System 10 according to exemplary embodiments of the disclosure may also exchange data with an external expert system, as shown in FIG. 5. In some embodiments, e.g., as shown in FIG. 6, system 10 may include a base station containing a clock and a plurality of expert systems associated with respective packaging and dispenser devices.

Clock

According to some embodiments of the present disclosure, clock 13 or 23 used may be electronic. In such embodiments, timing may be provided by a quartz crystal. Furthermore, clock 13 or 23 could also be mechanical and/or electro-mechanical.

Clock 13 or 23 may reset itself to zero after a certain length of time, e.g. every day, every week, every month, or every year.

Clock 13 or 23 may be adjusted to match natural rhythms, such as for example the menstrual cycle so as to adapt the hair or skin treatment preparations as a function of position within the menstrual cycle.

Clock 13 or 23 may also reset itself to zero after dispensing the preparation. This may be useful, for example, when it is desirable for system 10 to take account not of absolute time but of relative time since the most recent application.

The device may contain a plurality of clocks, e.g. one clock giving absolute time and another clock giving relative time.

As mentioned above, clock data may be given by an external signal. This signal may provide absolute time or it may serve to resynchronize internal clock 13.

Clock 13 may be internal to a microcomputer forming part of system 10.

It is possible to make system 10 in such a manner as to be able to adjust clock 13 or 23 and/or to take account of possible time differences.

Processing Clock Data

System 10 includes processor means enabling the time given by clock 13 or 23 to be converted into an action to be performed by adjustment system 12 or an indication to be given to the user so as to enable the user to act on adjustment system 12.

The processor means may perform conversion on the basis of one or more conversion tables and/or one or more conversion functions, and for example it may compare the time given by clock 13 or 23 with the times entered in the conversion or it may apply a conversion function to the time given by clock 13 or 23, in order to deduce therefrom the action that is to be performed.

Time may be expressed in terms of its various components, e.g. days (d), hours (h), minutes (min), and second (sec).

The conversion function or the conversion table may be applied to at least one of these components, e.g. hours.

For example, the intensity I representative of the content of at least one active agent may be expressed solely on the basis of the hour, without involving the day, e.g. using a function such as:

$$I=A/\mathrm{Abs}(B(h-12))$$

where A is a coefficient, B is a coefficient, and Abs represents the "absolute value" function. Under such circumstances, the intensity I will be at a maximum towards midday and at a minimum in the night.

The conversion function or conversion table may be applied to a plurality of time components in independent manner.

For example, the intensity I of the mixture may depend on both the hour and the day. For example, the conversion table giving the intensity I of a deodorant as a function of the time in hours H and the day of the week D (0=Sunday) may be arranged to provide best protection during the week and moderate protection (except in the evening) on Saturday, with moderate protection on Sunday, as shown in exemplary Table 1 below.

TABLE 1

| | H = [0-8] | H = [9-12] | H = [13-18] | H = [19-21] | H = [22-24] |
|---|---|---|---|---|---|
| D = 0 | I = 20 | I = 20 | I = 20 | I = 20 | I = 20 |
| D = 1 to 5 | I = 100 | I = 90 | I = 70 | I = 50 | I = 20 |
| D = 6 | I = 40 | I = 40 | I = 20 | I = 100 | I = 80 |

In Table 1, I lies in the range 0 to 100, these values corresponding to respective minimum and maximum contents for an antiperspirant active agent.

Conversion tables and functions may take account of additional parameters, possibly adjustable parameters, e.g. associated with the user (age, weight, activity, etc.) or associated with external parameters (temperature, wind, pressure, precipitation, etc.) For example, an "outdoor activity" parameter may be provided that is set high, e.g., to its maximum, during periods when one is often outside (e.g. working on a building site or on holiday), and low, e.g., to a minimum, during periods when one is often indoors (e.g. when hospitalized).

Provision may be made to enable the user to be able to modify or adjust the conversion tables or functions, e.g., via programming and/or user interfaces. Provision may also be made to enable the user to modify or adjust the additional parameters via similar interfaces.

The conversion tables or functions may also take account of a planned activity, e.g. by consulting a pre-recorded or downloaded diary.

The diary and the parameters may be downloaded at the time of first use and/or while system 10 is in use, e.g. over the Internet or by telephone.

When system 10 is adapted to be used by several people, system 10 may also identify the user and store in memory which conversion function or table it should refer to depending on the user. For example, system 10 may include a selector and/or suitable user interface enabling indication of who the user is. In a variant, system 10 may be capable of recognizing the user automatically, for example via biometric information that may be communicated to adjustment system 12 wirelessly or by wire (e.g., a biometric sensor installed on system 10).

A plurality of packaging and dispenser devices may cohabit the same location, with these devices potentially not being used in the same way. Therefore, provision may be made for the signal sent by the clock data processor means to be identified by adjustment system 12 associated with each packaging and dispenser device so as to ensure that such a signal corresponds to adjustment system 12. Thus, the clock data processor may transmit an identification code in the signal, and adjustment system 12 may be provided with a comparator system to identify the code that corresponds thereto. In this way, adjustment system 12 follows the instructions that are sent thereto and not the instructions that are intended for another packaging and dispenser device.

A packaging and dispenser device may also be arranged to inform the clock data processor means of its presence and/or of it being switched on (e.g., via a closure cap open indicator switch). It may also inform the processor about the compositions available, and said processor may use this information to adapt the instructions as desired.

According to embodiments of the present disclosure, a clock, one or more processors, and one or more adjustment systems are grouped together. System 10 is designed to dispense a plurality of different compositions, e.g. in the form of interchangeable reservoirs, or in the form of compositions placed in a movable dispenser rack, for example. In such an embodiment, the clock data processor may be capable of adjusting all of the packaging and dispenser devices.

In a particular example of the disclosure, system 10 is arranged to enable the user to disengage the adjustment so that it is no longer performed automatically as a function of the time data or so that it is performed in some other manner, e.g. manually.

Dispensing and Adjustment System

The disclosure may include one or more packaging and dispenser devices. Each device may include a plurality of reservoirs 11 containing fluids, e.g. liquids, creams, gels, suspensions, emulsions, etc., and/or other substances, but in general, not including gas phase substances, that are mixed in varying proportions as a function of the clock data, and where desired, of additional information, said additional information being delivered by way of example by one or more sensors of the surroundings or being transmitted by an external data transmitter.

System 10 may include a packaging and dispenser device having a plurality of different starting compositions, and adjustment system 12 may be arranged to enable at least one of the starting compositions to be dispensed as a function of clock data.

The device may include two reservoirs 11 and adjustment system 12 may act by modifying the flow rate of the composition coming from at least one of the reservoirs 11.

For example, one of the reservoirs 11 of the device may contain an inert starting composition and the other reservoir may contain a starting composition that is enriched with an active agent (e.g., a sun filter), for the purpose of varying the concentration of the active agent in the delivered preparation as a function of the clock data. The flow rate of the composition that is enriched in active agent may be adjusted by system 10 according to exemplary embodiments of the disclosure prior to being mixed with the inert composition, for example, to obtain the desired concentration of active agent in the mixture.

Figure 7:
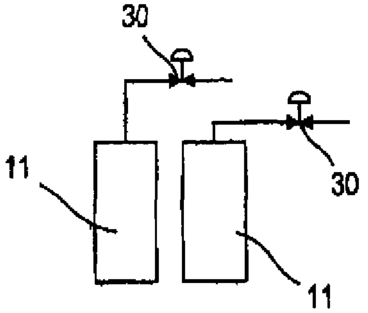

In order to vary the flow rate, it is possible to act on a flow section made available to the composition drawn from reservoir(s) 11, for example, using one or more valves 30, as shown in FIG. 7. For example, it is possible to use a pinch valve that flattens a flexible hose to a greater or lesser extent or a needle valve that acts by moving a needle in a fluid flow passage. This movement may be driven by a movable part of adjustment system 12, said part being moved in translation or in rotation or in some more complex movement, for example, and itself being driven by a motor, by a magnetic field, or by an electric field.

Figure 8:
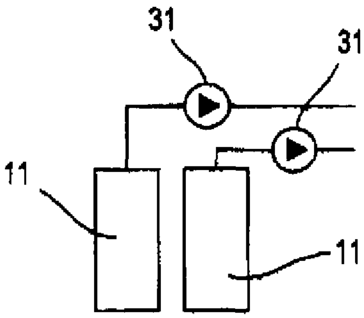
FIGS. 7 to 9 and 13 to 15 are diagrams showing examples of adjustment systems.

In some embodiments, it may be desired to act on the flow rate of a pump 31 to vary the content of active agent in the dispensed preparation, as shown in FIG. 8, said pump acting for example to take the active agent from the corresponding reservoir 11.

System 10 according to exemplary embodiments of the disclosure may have more than two reservoirs 11 and adjustment system 12 may adjust the flow rate of all or some of the compositions coming from those reservoirs to enrich the mixture with one or more active agent.

According to some embodiments of the present disclosure, the packaging and dispenser device is configured to perform volume metering by allowing a given volume of each of the starting compositions to pass, either in succession or simultaneously, to the outside or into a mixing chamber, for example.

According to some embodiments of the present disclosure, a source of energy is used as a function of clock data to activate an initially deactivated active agent that is contained in a starting composition. For example, adjustment system 12 may act in on/off manner to activate the active agent, or it may act gradually.

Figure 9:
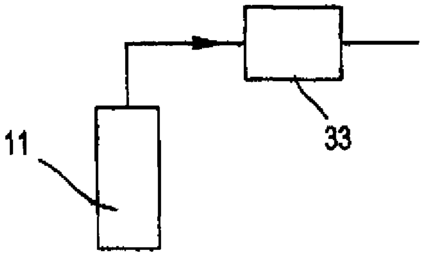

The active agent may be activated while the preparation is being dispensed, by causing the active agent to pass through an activation chamber 33, for example, as shown in FIG. 9. The active agent may be activated in a fixed or variable predefined quantity of the preparation, prior to it being dispensed by the device. For example, a certain quantity of the composition contained in a reservoir of the device is taken to the activation chamber 33. Before the composition leaves activation chamber 33, energy for activating the deactivated active agent is delivered, e.g., via the device. Only the active agent that is present in activation chamber 33 is activated. The active agent remaining in the reservoir 11 remains deactivated.

On each utilization, the degree of activation of the active agent may be different, depending on the clock data.

Figure 10:
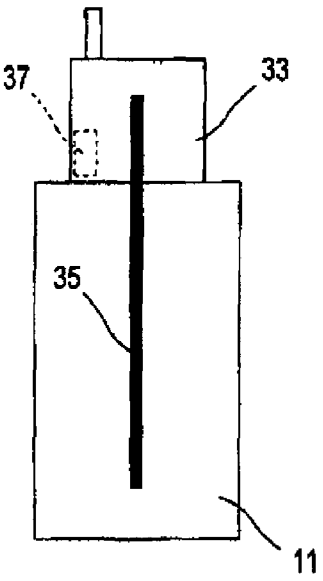
FIG. 10 is an example of a device according to the invention.

In order to cause the starting composition to enter the active agent chamber, it is possible to use a device of the kind shown in FIG. 10, having one or more flexible walls on which the user may press to cause the composition to flow from the reservoir 11 into the activation chamber 33, e.g. via a dip tube 35. An activation device 37 is present therein. After activation, the composition may be taken from the activation chamber 33 by any means, e.g. by pumping, a higher pressure generated by the user in the active agent chamber, pouring, or being taken by means of an applicator.

The active agent may be activated by the effect of a form of energy such as heat or light.

When a plurality of starting compositions are mixed together, the device may be provided with at least one mixing chamber enabling the active agent to be made uniform before the mixture leaves the device.

Mixing may take place at the outlet from the device. The device may include a member for stirring the mixture prior to dispensing it, e.g. a ball. The device may also include a dispenser endpiece including baffles.

When the device has two reservoirs containing starting compositions for mixing together extemporaneously, the mixing may take place outside the device.

Figure 11:
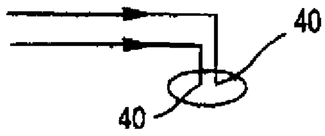
FIGS. 11 and 12 are schemes outlining different organizations of the feed ducts of a device according to the invention.

For example, the starting compositions for mixing may be delivered to the outside via distinct dispensing orifices 40, as shown in FIG. 11. These orifices may be located close together so as to enable the user to more easily receive the dispensed preparations. The starting compositions may come into contact with one another outside the device, on a surface from which they are taken.

In certain embodiments, the device has two reservoirs 11 with flexible walls, each having a delivery channel. The delivery channels may deliver composition close to each other, e.g. at a distance apart that is less than or equal to 5 millimeters (mm), e.g. 4 mm.

Various options exist for enabling a preparation to be dispensed with the desired active agent content.

For example, the dispenser device may have two reservoirs containing different starting compositions, the first reservoir containing, for example, a neutral composition and the second reservoir containing an active agent. The term "neutral composition" is used to mean a composition for mixing with at least one composition containing a primary or secondary active agent so as to make the preparation for dispensing.

The proportion of active agent in the delivered preparation may be adjusted by modifying head loss in the ducts connecting the reservoirs containing the starting compositions and the corresponding dispenser orifice(s).

Figure 13:
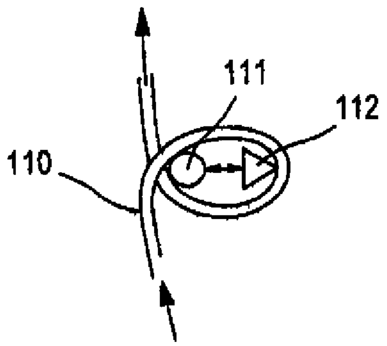

For example, as shown in FIG. 13, provision may be made for a device to pinch a duct 110 in which one of the starting compositions is flowing. For example, the duct 110 describes a loop bearing against a support 111 of the device, and a movable spacer element 112 controlled by system 10 is capable of spacing itself away from the support 111 to a greater or lesser extent so as to flatten the duct 110 to a greater or lesser extent. By way of example, the spacing of the movable element 112 is controlled by a motor (not shown). By way of example, the element 112 is triangular in shape and a spring may urge it against the duct 110 in the absence of power being applied to the motor. When the motor is powered, the element 112 is moved towards the support 110, and the duct returns elastically to a bore of greater inside section. By way of example, the motor used may be a stepper motor, e.g. of the Performax type, and by way of example the duct may be a flexible plastics tube having a diameter of, for example, 3 mm and a length of 55 mm.

Figure 12:
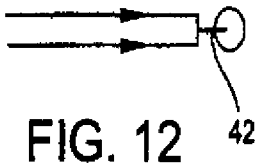

The feed ducts connected to the reservoirs may deliver via two separate dispenser orifices as shown in FIG. 11, or they may be united and deliver to the outside via a single dispenser orifice, for example, as shown in FIG. 12.

The proportions of the various starting compositions may also be adjusted by obtaining a greater or smaller actuating stroke in pumps that are actuated by the user, e.g., for dispensing the preparation, and that are associated with respective different starting compositions. For example, the pumps may have control rods for pushing, and one of the rods may be actuated over a constant stroke to dispense the neutral composition while the other rod is actuated over a variable stroke to dispense the active agent that is mixed with the neutral composition, this variable stroke being obtained for example by a transmission element under the control of a motor.

The compositions may also be dispensed by moving pistons over longer or shorter strokes.

Figure 16:
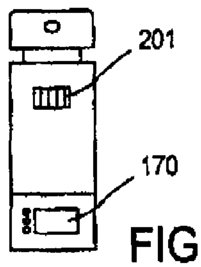

In FIG. 16, there can be seen an exemplary device that has a screen 170 suitable for displaying a recommended adjustment as a function of received data and possibly of data coming from various sensors and/or of user preferences.

The packaging and dispenser device may include a manual adjuster member 201 enabling the concentration of active agent in the dispensed preparation to be adjusted. Under such circumstances, the operation of the device is semi-automatic. The user actuates adjustment system 12 as a function of the displayed recommendations. Where desired, the screen 170 may form part of a base station that is separable (i.e., removable) from the packaging and dispenser device containing the reservoirs, so as to enable the base station to be used with other compositions.

Figure 17:
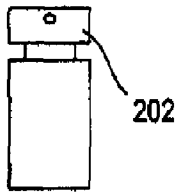

In FIG. 17, there can be seen a system 10 having a dispenser head 202 that is suitable for actuating by the user to dispense the preparation.

Figure 18:
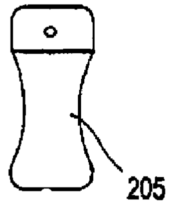

According to some embodiments, for example, as shown in FIG. 18, the preparation may be dispensed by providing the dispenser device with a body having a deformable wall 205, e.g. making it possible to reduce the inside volume(s) of the reservoir(s) containing the starting composition(s).

Figure 15:
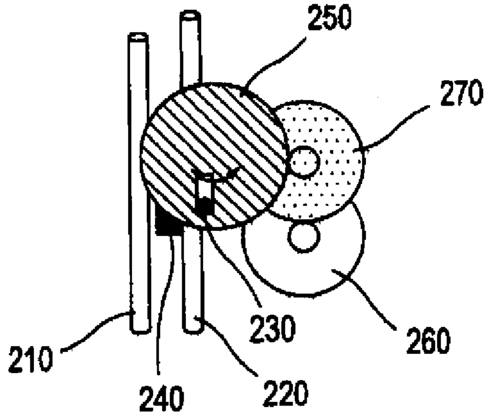

In the example of FIG. 15, the device includes two reservoirs containing starting compositions and connected to two outlet ducts 210 and 220, e.g. two flexible tubes made of plastics material having a diameter of, for example, 3 mm and a length of 25 mm.

One of the ducts 210 may be designed to remain open while the other duct 220 may be closed to a variable extent by a pinch valve, e.g. including a wire 230, e.g. a piano wire having a section of 1 mm and a length of 3 centimeters (cm). The wire may be positioned in a pre-stressed manner so as to flatten the duct against a stationary rigid part 240 of the device, e.g. a part that also supports the other duct 210. The natural elasticity of wire 230 is sufficient to pinch the duct 220 at rest so as to prevent the composition from passing therethrough, even when the user presses on the corresponding reservoir.

The other end of the wire 230 may be engaged in a small toothed wheel 250 having a slot. This wheel is driven by a motor 260 (e.g., direct current (DC) motor) and a gear train 270 that increases the torque delivered by the motor in proportion to the current.

When the motor 260 is powered, it transmits torque to the wheel 250, which pulls on the wire 230 and moves it away from the stationary part 240. The higher the current delivered to the motor 260, the less wire 230 flattens the duct 220, thereby enabling more composition to pass if the user presses on the second reservoir. When the motor is no longer powered, the elasticity of the wire 230 returns it to press again against the duct 220, which it flattens against the stationary part 240.

The energy for delivering the starting compositions may be provided, for example, by the user applying a force (e.g., pressing) on the two flexible reservoirs. Thus, fluid may be substantially prevented from leaving the reservoirs or passing along the outlet ducts unless the user presses on the reservoirs.

According to some embodiments of the present disclosure, e.g., as shown in FIGS. 17 and 18, the properties of the preparation may be adjusted automatically.

Figure 19:
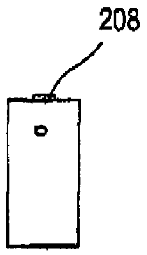

In FIG. 19, it can be seen that the device may not include user-driven actuator means for providing the energy for dispensing. For example, the device may include a trigger button 208 on which the user presses to trigger automatic dispensing of the preparation, e.g. by activating a pump.

Figure 20:
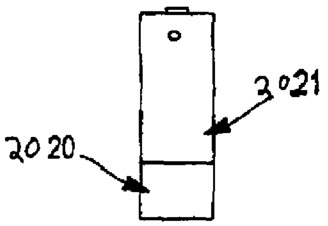

FIG. 20 shows the possibility of system 10 having a base station 2020 with electronic circuits and in particular the clock or the clock data receiver, and possibly the user interface together with all or part of adjustment system 12.

Figure 21:
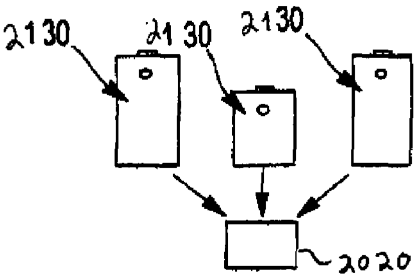

The base station 2020 may be fitted on the packaging and dispenser device 2021 containing the reservoir(s) of starting composition, the dispenser means, and all or part of adjustment system 12.

Where desired, as shown in FIG. 21, a single base station 2020 may be associated with a plurality of packaging and dispenser devices 1530, e.g. containing different compositions, e.g. for the purpose of delivering a preparation for providing protection against the sun or a preparation for providing protection against the cold.

The base station 2020 is advantageously arranged to recognize automatically the composition(s) contained in the packaging and dispenser device 2130 that is coupled therewith, so as to take account thereof in the adjustment it performs. By way of example, this recognition may be performed using electric contacts, an electronic chip, e.g. a radiofrequency identification (RFID) chip, a mechanical feeler, and/or an optical reader.

Figure 23:
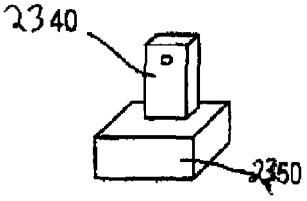
Figure 22:
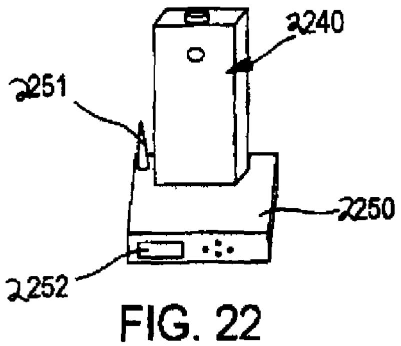

FIG. 22 shows the possibility of system 10 presenting two portions, namely comprising a packaging and dispenser device in the form of a handpiece 2240, e.g. containing the starting compositions and the dispenser means, and a base station 2250 that may be detached from the handpiece 2240 and containing, for example, the user interface, the screen 2252, and an optional antenna 2251 for receiving clock data.

Where desired, the base station 2250 serves as a docking station for receiving a mobile telephone (not shown) such as an iPhone®, etc., that may be used as a user interface, to receive clock data, and to perform all or some of the calculations involved in converting clock data into instructions for controlling adjustment system 12.

Where desired, the packaging and dispenser device may not be provided with any electrical adjustment actuator. The actuator may be present on the base station 2350, as shown in FIG. 23, and it may act via, for example, a mechanical transmission in co-operation with an adjustment member present in the handpiece 2340, e.g. a flow adjustment valve.

Figure 24:
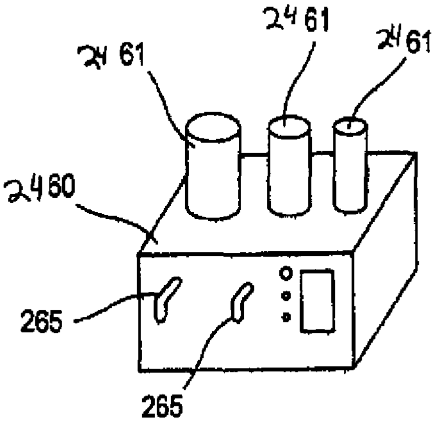

System 10 according to exemplary embodiments of the disclosure may not be miniaturized to such an extent as to be suitable for holding in the hand, and for example it may be presented, as shown in FIG. 24, in the form of an appliance that is bulkier, e.g. for placing on a counter or on a shelf in a bathroom. Such a system may include a housing 2460 suitable for releasably receiving containers 2461 containing the various starting compositions suitable for mixing together, together with one or more ducts 265 for dispensing one or more preparations of properties that are adapted to conditions of use by means of the clock data.

Where desired, the preparations may be dispensed without mixing any compositions, by selecting the composition to be delivered to the orifice for dispensing the preparation. In some embodiments, it may be desirable to mix a plurality of starting compositions together.

Adjustment may also be performed by releasing more or less of an active agent contained in a starting composition. According to embodiments of the present disclosure, energy (e.g., light, heat, electricity, etc.) may be used to activate an initially deactivated active agent that is contained in a starting composition, as a function of information coming from one or more sensors of the surroundings.

Thus, it is possible to heat an active agent that is meltable, such as a wax, or an active agent that is grafted on a thermolabile function, or an active agent that is held captive in a meltable active agent. Further, it is also possible to irradiate a photosensitive compound, such as an active agent grafted on a photolabile chemical function.

By way of example, adjustment system 12 may act in on/off manner to activate the active agent, or it may act in gradual manner.

The active agent may be activated while dispensing the preparation, by causing the active agent to pass through an activation chamber. In a variant, the active agent may be activated in a fixed or variable predefined quantity of preparation prior to being dispensed by the packaging and dispenser device.

For example, a certain quantity of fluid may be delivered to the outlet via an activation chamber. Before dispensing, the device delivers the energy for activating the deactivated active agent. Only the active agent present in the active agent chamber is activated. The active agent remaining in the reservoir remains unactivated.

Activation may take account of other information.

In the packaging and dispenser device or in a base station associated therewith, system 10 may include sensors, together with systems for collecting other information, e.g. at least one sensor for obtaining better knowledge about characteristics of the user, e.g. a sensor for sensing skin color or for sensing texture, etc.

System 10 may also include a receiver of data transmitted by a data transmitter external to the device, and means for acting on adjustment system 12 as a function of the data received by the receiver, or for informing the user of an action to be exerted on adjustment system 12, as a function of said data. Means for acting on the adjustment system 12 may include processing means which may perform various kinds of processing, and which may be complex to a greater or lesser extent and may be implemented in analog or digital manner. The means used may be incorporated entirely in system 10, e.g., incorporated entirely in the packaging and dispenser device. Alternatively, all or some of the processing of the signals delivered by the surroundings sensor(s) 11 may be implemented at an expert system that is external to system 10 or external to the packaging and dispenser device.

The received data may be associated with conditions of the surroundings, that may be selected from humidity, light (incorporating all or part of the visible spectrum, ultraviolet B (UVB), ultraviolet A (UVA), infrared (IR)), temperature, the electrical conductivity of the air, the magnetic and electric field, pressure, wind, precipitation, fog, ionization, the presence of liquid or solid particles, the transparency of the air, the presence of a gaseous chemical compound ($CO_2$, CO, $N_2$, $O_2$, $O_3$, $NO_2$, $NO_3$), the presence of a particular atom (sulfur), the presence of insects, e.g. mites, or of particles such as pollen. This data received by the device may relate to present or forecast conditions of the surroundings.

The term "sensor of the surroundings" is used to mean a sensor that is not for measuring the characteristics of the skin or the hair and that is designed to measure a magnitude associated with the environment in which people are immersed, e.g. a characteristic of the surrounding air or of exposure to solar radiation. Such a sensor may measure a characteristic of the surrounding air, for example.

The sensor of the surroundings is thus something other than a sensor of the moisture or the color of the skin or the hair and it is not designed to be put into contact with the skin or the hair when taking a measurement. When measuring humidity or temperature, the sensor of the surroundings may be internal to the device and situated behind a wall of a housing of the device.

The data received may come from international, national, or local weather forecast centers, from meteorological measurement centers, weather beacons, regional weather stations, information centers, e.g. TV, radio, Internet, and individual measurement stations, e.g. including a thermometer, a barometer, and/or an anemometer. The set of stations that provide the data may collect data from locations that are deemed to be desirable for obtaining a clear reading, free from ambiguity concerning the conditions of the surroundings. This data may possibly be interpreted by specialists in order to provide forecasts that are as reliable as possible.

In a variant, system 10 operates with two or more sensors of the surroundings, which send data to adjustment system 12. Adjustment system 12 receiving various kinds of data may process it in various ways, e.g. by adding signals. This may apply for example to a system delivering a preparation against skin drying, and making use of a light sensor and a temperature sensor, adding their signals together so that the device responds in the same direction if light or temperature increases.

In a variant, system 10 may take the difference between signals coming from two sensors of the surroundings. By way of example, this may apply to a system that delivers a preparation against insects, e.g., mosquitoes, including a light sensor and a humidity sensor. The content of the anti-mosquito agent in the preparation as delivered decreases with increasing intensity of light and increases with increasing humidity.

System 10 may also have two or more sensors of the surroundings associated with respective different active agents, e.g. contained in respective reservoirs. The content of each active agent may depend on one or more sensors of the surroundings.

In an example, each active agent has a concentration in the delivered preparation that is associated with data delivered by a sensor of the surroundings that is specific thereto.

The clock data may enable system 10 to calculate forthcoming light, for example. Where ultraviolet (UV) radiation sensing indicates a value even though the clock indicates that is early in the day, system 10 may take account thereof in adjusting the index of protection, using an index that is higher than that corresponding to the measured value. Conversely, if it is already late in the day, based on clock data, system 10 may likewise take this into account and provide for an index of protection that is lower than that corresponding to the measured value.

The strength of a preparation may be adjusted on the basis of the time when some other preparation was used. For example, the strength of a makeup remover may be adjusted by system 10 according to exemplary embodiments of the disclosure as a function of the moment when the makeup was applied.

Display

System 10 may include a display (e.g., screen 170) to display data such as absolute time, one or more relative times, the current program, the nature of the mixture, e.g. the intended or already-prepared index of protection, among other things, to a user. For example data may be provided instructing a user of actions to be taken on system 10, e.g., based on the clock data.

System 10 may be configured to warn the user of the desire to reapply the preparation or to change the mixture, e.g. if it detects that conditions have changed.

The clock data may also serve to warn of a use-by date that has been passed or that is approaching, or it may warn the user that some action may be taken, e.g. rinsing.

EXAMPLES

A system is provided that has two flexible reservoirs, each having a respective delivery channel, the channels opening out at a distance of 4 mm apart from each other, for example.

Thus, when the two compositions contained in the reservoirs are delivered, the user recovers a mixture obtained by the two compositions coming into contact and diffusing.

Figure 14:
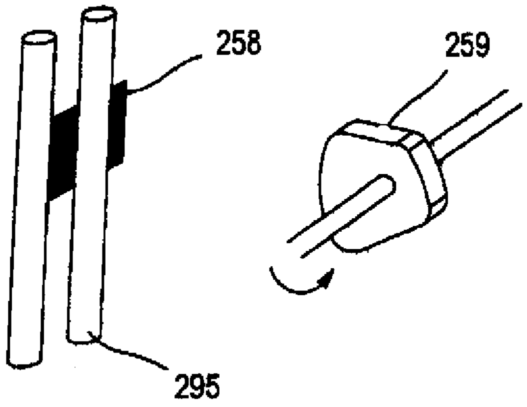

By way of example, the outlet channel from the first reservoir may be a flexible plastics tube having a diameter of 3 mm and a length of 25 mm and the outlet channel from the second reservoir may be a flexible plastics tube having a diameter of 3 mm and a length of 25 mm that is held by a rigid and stationary part 258 on its rear face, as shown in FIG. 14.

A cam 259 is placed in front of the outlet channel 295 of the second reservoir. In its rest position, cam 259 compresses outlet channel 295. When the axis of the cam 259 turns, the cam 259 releases its pressure on the outlet channel 295.

Energy for expelling the fluids may be provided by the user applying pressure to the two flexible reservoirs. Thus, fluid may be substantially prevented from escaping from the reservoirs and may not pass into the channel 295 unless the user presses against the reservoirs.

A switch is placed on one of the reservoirs (e.g., the first reservoir). When taking hold of the packaging and dispenser device, the user presses against the reservoir and actuates the switch. When the user is not holding the device, the switch may default to off.

A clock may be used and the clock data may be processed by a processor and/or a processor means constituted by a complex programmable logic device (CPLD) type logic array, under the trademark Altera, of the type Max II. This type of logic array is miniature, preprogrammable, frugal in energy consumption, and suitable for being powered, for example, continuously by an incorporated 3 volt (V) battery.

One of the input/outputs of the logic array is connected to the switch and another of the input/outputs of the logic array is connected to a servomotor.

Its programming may include incrementing a time value continuously.

When the switch is closed, the logic array converts the time value into days (0 to 364, 1 corresponding to January 1st) and hours (0 to 24, 0 corresponding to midnight), and compares the day and hour values with a conversion table. The output (S) from the table gives the concentration of the enrichment of a composition in the final mixture. S in the tables below is a relative value comprised between 0 and 10

The logic array converts the output data S from the conversion table into a pulse width modulation (PWM) signal for controlling the servomotor and the rotation of the cam, and thus for controlling the extent to which the channel of the second reservoir is opened.

So long as the switch is on, the PWM signal is maintained. If the switch is released, the PWM signal is stopped only one minute after the switch has been released.

The servomotor connected to the power supply (5 V) is capable of performing half a revolution depending on the PWM signal.

A protective cap covers the top of system 10 to avoid the arrival of dirt.

Example 1

Skin Treatment Preparation

The first reservoir is filled with a gel containing 20% glycerin and the second reservoir with a gel containing 30% of UV filter.

The conversion is shown at Table 2, where S corresponds to enrichment in composition from the second reservoir:

TABLE 2

| S | H = 0-8 | H = 8-12 | H = 13-17 | H = 18-23 |
|---|---|---|---|---|
| D = [1-100] | 0 | 3 | 3 | 0 |
| D = [101-169] | 2 | 4 | 8 | 2 |
| D = [170-240] | 4 | 8 | 10 | 5 |
| D = [241-364] | 2 | 6 | 6 | 2 |

The user removes the protective cap and actuates the switch on taking hold of the device.

After a few seconds, the user may squeeze the device so as to force the contents of the reservoirs to be expelled via the respective outlet channels.

Depending on the time of use, the mixture is enriched to a greater or lesser extent in filter or in care product as represented by the values within the table.

Example 2

Hair Coloring Preparation

The first reservoir is filled with a gel containing a tint of brown color and the second reservoir is filled with a gel containing a tint of red color. Furthermore, the gel contains a sun filter (10%).

The conversion table is shown at Table 3, where S corresponds to enrichment in the composition from the second reservoir:

TABLE 3

| S | H = 0-23 |
|---|---|
| D = [1-100] | 10 |
| D = [101-169] | 6 |
| D = [170-240] | 2 |
| D = [241-364] | 8 |

The user removes the protective cap and actuates the switch by taking hold of the device.

After a few seconds, the user squeezes the flask, causing both compositions to be expelled through their respective outlet channels.

Depending on the time of use, the mixture is enriched to a greater or lesser extent in filter and in red colorant as shown by the values within the table.

During cold seasons, the tint is enriched in red colorant, which serves to increase the illumination of the face. This color enhances the color of the face.

During sunny seasons, the tint is depleted in red colorant. Given the ambient light and the complexion of the skin, the result is more pleasing in appearance.

The present disclosure is not limited to the examples described above. For example, the implementation characteristics of the various embodiments may be combined together in variants that are not shown.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific measurement values for described elements should be understood to be within generally accepted manufacturing or industry tolerances, and any use of the terms substantially and/or approximately should be understood to mean falling within such generally accepted tolerances.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A cosmetic or dermatological system comprising:

a handheld packaging and dispenser device including one or more compositions from which a preparation is delivered;

an internal clock and/or a clock data receiver;

an adjustment system coupled to or configured to be coupled to the packaging and dispenser device, enabling at least one property of the preparation to be modified; and a processor for automatically controlling the adjustment system as a function of at least clock data delivered by the internal clock and/or the clock data receiver, or for informing the user, as a function of at least the clock data, of an action to be taken on the adjustment system.

2. The system according to claim 1, configured to modify a concentration of at least one active agent in the preparation based on at least the clock data.

3. The system according to claim 1, the packaging and dispenser device further comprising two reservoirs, each reservoir containing a starting composition for mixing to form the preparation, the adjustment system enabling the ratio of one starting composition relative to the other to be varied during dispensing, based on at least said clock data.

4. The system according to claim 1, the packaging and dispenser device having two reservoirs, a first reservoir of the two reservoirs containing a first starting composition, and a second reservoir of the reservoirs containing a second starting composition different from the first starting composition, the adjustment system being configured to distribute a selected one of the first and second starting compositions based on at least said clock data.

5. The system according to claim 1, the processor being configured to cause operation of the adjustment system based on a function of a duration that has elapsed since a reference time.

6. The system according to claim 5, further comprising an elapsed time meter that is reinitialized after each use of the packaging and dispenser device.

7. The system according to claim 1, wherein the processor is configured to cause operation of the adjustment system based on a function of absolute time.

8. The system according to claim 1, wherein the processor is configured to cause operation of the adjustment system based on a function of a physiological cycle and of a correspondence between the physiological cycle and the clock data.

9. The system according to claim 1, the system being configured to access an electronic diary of the user and to adjust the property of the preparation based on at least data coming from the diary and the clock data.

10. The system according to claim 1, said clock data comprising time and date data.

11. The system according to claim 1, including a signaling device enabling a message to be broadcast based on at least the clock data.

12. The system according to claim 1, further comprising a base station associated with the packaging and dispenser device, the base station including the internal clock and/or the clock data receiver, the base station being configured to control the adjustment system based on clock data provided by the internal clock and/or the clock data receiver.

13. The system according to claim 12, including a plurality of packaging and dispenser devices associated with the base station.

14. A method of cosmetically treating skin or hair, comprising:

automatically adjusting an adjustment of a packaging and dispenser device system to result in a dispensing a preparation for application to at least one of skin and hair, the preparation being dispensed by a cosmetic system, the system including a packaging and dispenser device containing at least one starting composition, and an adjustment system enabling a property of the dispensed preparation to be varied, in which method the adjustment system is controlled automatically at least based on clock data in order to adapt the property of the preparation to the time and/or date of use of said preparation by a person.

15. The method according to claim 14, the adjustment being performed also as a function of data provided by a sensor of surroundings and/or data other than clock data and coming from an external transmitter.

16. A cosmetic or dermatological system comprising:

a packaging and dispenser device including one or more compositions from which a preparation to be delivered in a fluid form suitable for an application onto skin, mucous membranes or keratinous fibers;

an internal clock and/or a clock data receiver;

an adjustment system coupled to or suitable for being coupled to the packaging and dispenser device, enabling at least one property of the preparation dispensed by the packaging and dispenser device to be modified, the adjustment system configured to modify a concentration of at least one active agent in the preparation; and a processor for controlling the adjustment system, the controlling based on at least of clock data delivered by the internal clock and/or the clock data receiver, or for informing the user, at least as a function of the clock data, of an action to be taken on the adjustment system.

17. A cosmetic or dermatological system comprising:

a packaging and dispenser device including one or more compositions from which a preparation to be delivered in a fluid form suitable for an application onto skin, mucous membranes or keratinous fibers;

an internal clock and/or a clock data receiver;

an adjustment system coupled to or suitable for being coupled to the packaging and dispenser device, enabling at least one property of the preparation dispensed by the packaging and dispenser device to be modified; and a processor for controlling the adjustment system as a function at least of clock data delivered by the internal clock and/or the clock data receiver, wherein the controlling is based on an absolute time.

* * * * *